United States Patent
Rusev et al.

(10) Patent No.: US 11,334,336 B2
(45) Date of Patent: May 17, 2022

(54) AUTOMATIC CREATION OF DEVICE CAMPAIGNS

(71) Applicant: VMware, Inc., Palo Alto, CA (US)

(72) Inventors: Sabo Rusev, Sofia (BG); Militsa Borisova, Sofia (BG); Ivo Petkov, Sofia (BG); Dobromir Ivanov, Sofia (BG); Ilya Mayorski, Sofia (BG)

(73) Assignee: VMware, Inc., Palo Alto, CA (US)

( * ) Notice: Subject to any disclaimer, the term of this patent is extended or adjusted under 35 U.S.C. 154(b) by 335 days.

(21) Appl. No.: 16/249,077

(22) Filed: Jan. 16, 2019

(65) Prior Publication Data

US 2020/0225928 A1 Jul. 16, 2020

(51) Int. Cl.
 G06F 9/44 (2018.01)
 G06F 8/65 (2018.01)
 H04L 67/00 (2022.01)
 H04L 67/12 (2022.01)
 H04L 9/32 (2006.01)

(52) U.S. Cl.
 CPC .............. G06F 8/65 (2013.01); H04L 9/3268 (2013.01); H04L 67/12 (2013.01); H04L 67/34 (2013.01)

(58) Field of Classification Search
 CPC ......... G06F 8/65; H04L 9/3268; H04L 67/12; H04L 67/34; H04L 63/20
 USPC ......................................................... 717/173
 See application file for complete search history.

(56) References Cited

U.S. PATENT DOCUMENTS

| | | | | |
|---|---|---|---|---|
| 7,809,667 | B1* | 10/2010 | Yehuda | G06F 21/552 706/47 |
| 2007/0107043 | A1* | 5/2007 | Newstadt | H04L 63/20 726/2 |
| 2009/0205011 | A1* | 8/2009 | Jain | G06F 8/65 726/1 |
| 2013/0227540 | A1* | 8/2013 | Ruster | G06F 8/65 717/170 |
| 2018/0088925 | A1* | 3/2018 | Emeis | G06T 11/206 |
| 2019/0347164 | A1* | 11/2019 | Nightingale | G06F 8/71 |
| 2020/0201983 | A1* | 6/2020 | Shantharam | G06F 21/51 |
| 2020/0213360 | A1* | 7/2020 | Ojha | H04W 12/0804 |

* cited by examiner

Primary Examiner — Timothy A Mudrick
(74) Attorney, Agent, or Firm — Thomas | Horstemeyer LLP (57) ABSTRACT

Approaches for automatically creating device campaigns are disclosed herein. A computing device first determines that a second version of a software package assigned to an existing device campaign has been uploaded to a data store. The existing device campaign can include an existing compliance policy applicable to individual IoT endpoints assigned to the existing device campaign. The compliance policy may specify that a first version of the software package be installed on the individual IoT endpoints. In response, to the change, the computing device can create a new device campaign that includes a new compliance policy applicable to the individual IoT endpoints assigned to the new device campaign. The new compliance policy may specify that the second version of the software package be assigned to the individual IoT endpoints.

20 Claims, 3 Drawing Sheets

AUTOMATIC CREATION OF DEVICE CAMPAIGNS

BACKGROUND

As the costs for electronic components have decreased, network and computational capabilities have been added to a wide range of devices that were typically operated independently. For example, appliances have network connectivity and computing components, allowing household appliances such as a refrigerator to reorder food from the grocery store for delivery or for a washing machine or a dryer to send an alert to a smartphone indicating that the appliance is finished. Automobiles have network connectivity, allowing individual components of the automobile to connect to the Internet, such as, allowing the radio to stream music from the Internet. Even thermostats and sprinkler controllers have network connectivity, allowing adjustment of settings based on weather reports downloaded from the Internet or remote adjustment of settings using a smartphone or computing device. The ever expanding number of devices which incorporate network connectivity and computational ability is often referred to as the "Internet of Things."

However, the scale of the Internet of Things presents a number of management issues. For example, where an enterprise can have had a few hundred computers that could be manually administered by an information technology (IT) department, the number of devices in the Internet of Things can result in tens of thousands of network connected devices being deployed in an enterprise environment. Management of these devices, such as requirements to deploy security patches or update configuration settings, at such scale strains the resources of not just IT departments, but also of many automated solutions employed by enterprises for managing network connected devices.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various approaches for automating the management of network connected devices, such as Internet of Things (IoT) devices. Various applications or operating systems can be installed on IoT devices. As new versions of these applications or device firmware become available, an administrator may wish to update managed IoT devices to use the new versions. However, in order to cause the new versions of the applications or device firmware to be installed on the managed IoT devices, a rule must be created that enforces the installation of the new versions. To automate the creation of new rules, preexisting rules governing the installation of older versions of the applications or device firmware are copied. The new versions of the applications or device firmware are specified in the copies of the rules. The modified copy of the rule is then saved, thereby creating a new rule to enforce the installation of the new version of the application or device firmware.

Figure 1:
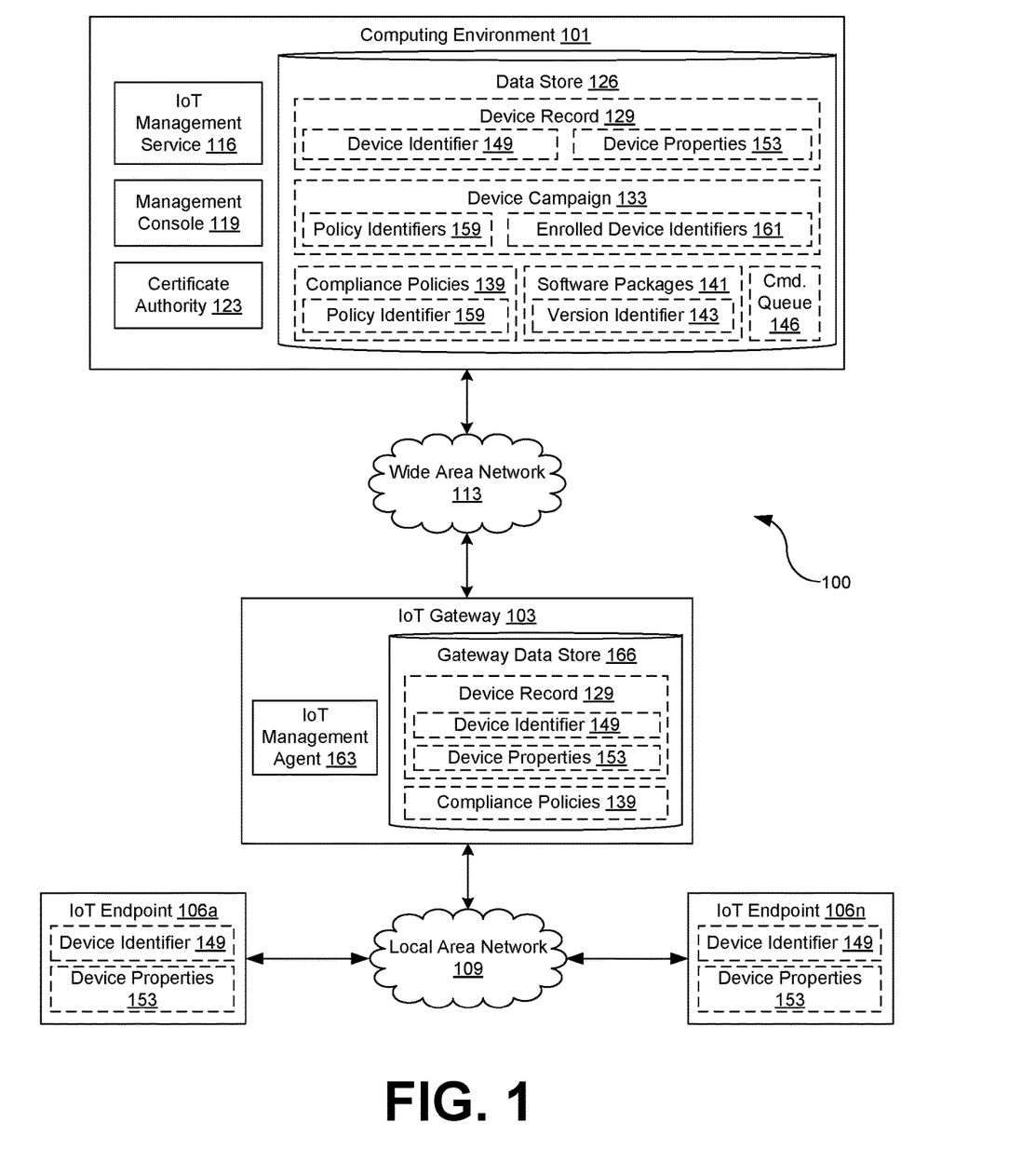
FIG. 1 is a drawing illustrating an example arrangement of a network environment according to various embodiments of the present disclosure.

As illustrated in FIG. 1, shown is a network environment 100 according to various embodiments. The network environment 100 includes a computing environment 101, an internet of things (IoT) gateway 103, and a number of IoT endpoints 106a-n. The computing environment 101, the IoT gateway 103, and the IoT endpoints 106a-n can be in data communication with each other. For example, multiple IoT endpoints 106a-n can be in data communication with each other or with an IoT gateway 103 over a local area network (LAN) 109. The IoT gateway 103 can in turn be in data communication with the computing environment 101 over a wide area network (WAN) 113.

The LAN 109 represents a computer network that interconnects computers within a limited area or a limited logical grouping. For example, the LAN 109 could include a wired or wireless network that connects computing devices within a building (such as a residence, office, school, laboratory, or similar building), collection of buildings (such as, a campus, an office or industrial park, or similar locale etc.), a vehicle (such as an automobile, an airplane, train, a boat or ship, or other vehicle), an organization (such as devices with network connectivity owned or leased by an organization), or other limited area or limited grouping of devices.

The WAN 113 represents a computer network that interconnects computers that are members of separate LANS 109. Accordingly, the WAN 113 can correspond to a network of networks, such as the Internet.

The LAN 109 and the WAN 113 can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless WI-FI® networks, BLUETOOTH® networks, microwave transmission networks, as well as other networks relying on radio broadcasts. The LAN 109 or the WAN 113 can also include a combination of two or more networks.

The computing environment 101 can include, for example, a server computer or any other system providing computing capability. Alternatively, the computing environment 101 can employ a plurality of computing devices that can be arranged, for example, in one or more server banks, computer banks, or other arrangements. Such computing devices can be located in a single installation or can be distributed among many different geographical locations. For example, the computing environment 101 can include a plurality of computing devices that together can include a hosted computing resource, a grid computing resource or any other distributed computing arrangement. In some cases, the computing environment 101 can correspond to an elastic computing resource where the allotted capacity of processing, network, storage, or other computing-related resources can vary over time.

Various applications or other functionality can be executed in the computing environment 101 according to various embodiments. The components executed on the computing environment 101, for example, can include an IoT management service 116, a management console 119, a certificate authority 123, and other applications, services, processes, systems, engines, or functionality not discussed in detail herein.

Also, various data is stored in a data store 126 that is accessible to the computing environment 101. The data store 126 can be representative of a plurality of data stores 126, which can include relational databases, object-oriented databases, hierarchical databases, hash tables or similar key-value data stores, as well as other data storage applications or data structures. The data stored in the data store 126 is associated with the operation of the various applications or functional entities described below. This data can include one or more device records 129, one or more device campaigns 133, one or more compliance policies 139, one or more software packages 141, one or more command queues 146, and potentially other data.

The IoT management service 116 can be executed to oversee the operation of IoT gateways 103 and IoT endpoints 106 enrolled with the IoT management service 116. The IoT management service 116 can further cause device records 129 to be created, modified, or deleted (such as in response to enrollment or unenrollment or registration of an IoT endpoint 106). Commands issued by the IoT management service 116 for IoT endpoints 106 or IoT gateways 103, such as to apply settings or perform actions specified by compliance policies 139, can be stored in the command queue 146 by the IoT management service 116. As discussed later, the IoT gateway 103 can retrieve and execute any commands stored in the command queue 146.

The management console 119 can be executed to provide an administrative interface for configuring the operation of individual components in the network environment 100. For example, the management console 119 can provide an administrative interface for the IoT management service 116, and/or the certificate authority 123. The management console 119 can also provide an interface for the configuration of compliance policies 139 applicable to IoT endpoints 106. Accordingly, the management console 119 can correspond to a web page or a web application provided by a web server hosted in the computing environment 101.

The certificate authority 123 can be executed to issue and validate cryptographic certificates. For example, the certificate authority 123 can issue cryptographic certificates to services or devices in response to a request for a certificate. The certificate authority 123 can also validate the authenticity of certificates that have been issued by the certificate authority 123. For example, an application executing on the IoT gateway 103 or the IoT endpoint 106 can request that the certificate authority 123 validate a certificate issued to a service or server with which the IoT gateway 103 or IoT endpoint 106 is interacting.

A device record 129 can represent an IoT endpoint 106 enrolled with and managed by the IoT management service 116. Accordingly, a device record 129 can be created by the IoT management service 116 in response to enrollment of a respective IoT Endpoint 106. Therefore, each device record 129 can include a device identifier 149, one or more device properties 153, and potentially other data associated with an enrolled IoT endpoint 106.

A device identifier 149 can represent data that uniquely identifies an IoT endpoint 106 with respect to another IoT endpoint 106 and, therefore, allow one to uniquely identify one device record 129 with respect to another device record 129. Examples of device identifiers 149 include media access control (MAC) addresses of network interfaces of individual IoT endpoints 106, globally unique identifiers (GUIDs) or universally unique identifiers (UUIDs) assigned to enrolled IoT endpoints 106, international mobile equipment identifier (IMEI) numbers assigned to cellular modems of IoT endpoints 106, and tuples that uniquely identify an IoT endpoint 106 (such as a combination of a manufacturer name and serial number). However, other information can also be used as a device identifier 149 in various implementations.

A device property 153 can represent information related to or regarding an IoT endpoint 106. In some instances, a device property 153 can reflect the status of an IoT endpoint 106 or a component of an IoT endpoint 106. Examples of device properties 153 can include information about the IoT endpoint 106 itself, such as the manufacturer, model name and model number, model revision of the IoT endpoint 106. Similarly, device properties 153 can include information such as identifiers of software packages 141 installed on the IoT endpoint 106, version information for software packages 141 installed on the IoT endpoint 106, and potentially other information.

A device campaign 133 can represent a set or collection of compliance policies 139 that have been assigned to one or more IoT endpoints 106. When an IoT endpoint 106 is assigned to a device campaign 133, the IoT management service 116 can cause any compliance policies 139 identified by or associated with the device campaign 133 to be enforced on the IoT endpoint 106, as later described. Accordingly, the device campaign 133 can include one or more policy identifiers 159 that identify individual compliance policies 139 assigned to or associated with the device campaign 133, and a list of enrolled device identifiers 161 that includes device identifiers 149 identifying device records 129 for IoT endpoints 106 subject to the device campaign 133. Other information can also be stored in a device campaign 133 as desired for individual implementations.

A compliance policy 139 represents a definition of a state in which an IoT endpoint 106 is required to be. For example, a compliance policy 139 can specify that an IoT endpoint 106 have a particular version or a minimum version of a software package 141 installed. If the IoT endpoint 106 fails to have the version of the software package 141 installed, then the IoT endpoint 106 can be considered to be non-compliant. Other examples of compliance policies 139 can include a requirement that a particular setting for an IoT endpoint 106 be enabled or disabled, a requirement that the IoT endpoint 106 be configured in a particular manner, or other requirements appropriate for particular implementations. A compliance policy 139 can also include a policy identifier 159 that uniquely identifies a compliance policy 139 with respect to other compliance policies 139. Examples of policy identifiers 159 can include an incremented integer or similar value, a GUID, a UUID, or similar unique identifier.

In some implementations, a compliance policy 139 can also specify a remedial action if the IoT endpoint 106 is determined at a later point in time to not be in a state consistent with the state specified by the compliance policy 139. For example, if the compliance policy 139 specifies that a particular version of a software package 141 be installed on an IoT endpoint 106, the compliance policy 139 may also specify that if that version of the software package 141 is not installed on the IoT endpoint 106, then the software package 141 should be installed or reinstalled. Such remedial actions allow for non-compliant or formerly compliant IoT endpoints 106 to be brought into compliance.

Software packages 141 represent installers or installation packages for applications to be executed by an IoT endpoint 106 or firmware for the IoT endpoint. In some instances, the software package 141 can include an executable program that, when executed by an IoT endpoint 106, installs or updates a respective application on the IoT endpoint 106. In other instances, the installer represents a package of files that, when unpacked by an application executing on the IoT endpoint 106, results in the installation of the respective application. Examples of software packages include MICROSOFT WINDOWS® MSI and PPKG files, RED-HAT® Package Manager (RPM) files, DEBIAN® installer files, ANDROID® Package (APK) files, and similar package formats for applications of device firmware.

A software package 141 can include various metadata, such as a version identifier 143. The version identifier 143 can indicate the version of the software package 141 in order to differentiate between older and more recent versions of the software package 141. In some instances, the version identifier 143 can be represented as a number or serious of numbers, an alphanumeric character string, a checksum, or a combination of two or more of these representations (e.g., a combination of a number and a checksum).

A command queue 146 can represent a queue of commands sent from an IoT management service 116 to an IoT management agent 163. When the IoT management service 116 sends a command or instruction, such as a command to apply a compliance policy 139 specified in a device campaign 133 to an IoT endpoint 106, the command can be stored in the command queue 146 until the IoT management agent 163 retrieves the command from the command queue 146. In some instances, a dedicated command queue 146 can be created for each instance of an IoT management agent 163. In other instances, however, a single command queue 146 can be used to store commands intended for multiple IoT management agents 163.

The IoT gateway 103 represents a computing device that acts as a proxy or relay between IoT endpoints 106a-n and the IoT Management service 116. For example, an IoT gateway 103 can represent a network access point or interface between the local area network 109 and the wide area network 113. In other instances, the IoT gateway 103 can be a dedicated device attached to the LAN 109 that communicates across the WAN 113 with the IoT management service 116 on behalf of IoT endpoints 106 attached to the LAN 109.

An IoT management agent 163 can be executed by the IoT gateway 103 to perform various functions on behalf of the IoT endpoints 106a-n. For example, the IoT management agent 163 can register or enroll IoT endpoints 106a-n with the IoT management service 116. As another example, the IoT management agent 163 can download, process, and enforce one or more applicable compliance policies 139. For instance, the IoT management agent 163 can retrieve a command from the command queue 146. The command can instruct the IoT management agent 163 to install an updated software package 141 on several IoT endpoints 106. Accordingly, the IoT management agent 163 could then download the specified version of the specified software package 141 and relay it to the respective IoT endpoints 106 for installation.

The gateway data store 166 can be representative of a plurality of gateway data stores 166, which can include relational databases, object-oriented databases, hierarchical databases, hash tables or similar key-value data stores, as well as other data storage applications or data structures. The data stored in the gateway data store 166 is associated with the operation of the various applications or functional entities described below. This data can include one or more device records 129 of respective IoT endpoints 106a-n, any applicable compliance policies 139, and potentially other information as appropriate for an implementation.

An IoT endpoint 106 is representative of any internet connected embedded device, appliance, sensor, or similar smart device. Examples of IoT endpoints 106 can include network connected home appliances (such as locks, refrigerators, thermostats, sprinkler controllers, smoke detectors, garage door openers, light-switches, fans, lights, security cameras, or similar devices), vehicular electronics (such as on-board diagnostic computers, entertainment systems, access controls, or similar devices), and other similar network connected devices. IoT endpoints 106 are often distinguishable from other client devices (such as personal computers or mobile devices) by their lack of functionality. For example, IoT endpoints 106 often do not provide general purpose computing abilities, lack an operating system that allows for a remote management service to gain direct administrative control over the IoT endpoint 106, and/or IoT endpoints 106 are not configured or configurable to execute an IoT management agent 163.

Often, an IoT endpoint 106 can also store a device identifier 149 that uniquely identifies the IoT endpoint 106 and one or more device properties 153. In some instances, one or more of these values can be set by the manufacturer. In other instances, one or more of these values can be set or specified by the IoT management service 116.

Next, a general description of the operation of the various components of the networked environment 100 is provided. However, more detailed descriptions of the operation of individual components of the networked environment 100 is set forth in the discussion of the subsequent figures.

To begin, an IoT endpoint 106 can enroll itself with the IoT management service 116. Accordingly, the IoT endpoint 106 can send a registration or enrollment request to the IoT management agent 163 executing on the IoT gateway 103. The enrollment request can include the device identifier 149 for the IoT endpoint 106. In some instances, the enrollment request can also include one or more device properties 153. However, in other instances, the device properties 153 can be provided later. In some implementations, the IoT endpoint 106 can sign the enrollment request using a certificate installed by the manufacturer of the IoT endpoint 106. However, the enrollment request can also include other authentication credentials in various implementations.

The IoT management agent 163 then verifies or authenticates the IoT endpoint 106. For example, the IoT management agent 163 can send a request to the certificate authority 123 to verify the certificate used to generate the signature of the enrollment request provided by the IoT endpoint 106.

After verifying the IoT endpoint 106, the IoT management agent 163 enrolls the IoT endpoint 106 with the IoT management service 116. For example, the IoT management agent 163 can relay the enrollment request from the IoT endpoint 106. As another example, the IoT management agent 163 can generate its own enrollment request that contains the device identifier 149. In some instances, the IoT management agent's 149 enrollment request can also include the device properties 153 of the IoT endpoint 106, if they were provided by the IoT endpoint 106.

In response to receipt of the enrollment request from the IoT management agent 163, the IoT management service 116 can perform several operations. First, the IoT management service 116 can verify the enrollment request. For example, the IoT management service 116 can verify with the certificate authority 123 the certificate used by the IoT management agent 163 or the IoT endpoint 106, as appropriate, to sign the enrollment request is a valid certificate.

If the certificate and signatures are valid, then the IoT management service 116 can proceed to enroll the IoT endpoint 106. For example, the IoT management service 116 can create a device record 129 for the IoT endpoint 106 that includes the device identifier 149 of the IoT endpoint 106. If the device properties 153 for the IoT endpoint 106 were included in the enrollment request, then the IoT management service 116 can include the device properties 153 in the device record 129 as well.

Otherwise, the IoT management service 116 can send a request to the IoT management agent 163 for the device properties 153 of the IoT endpoint 106 being registered. For example, the IoT management service 116 can place a command in a command queue 146 associated with the IoT management agent 163. When the IoT management agent 163 checks the command queue 146, it can retrieve the command requesting the device properties 153 of the IoT endpoint 106 and provide them in response. Upon receipt of the device properties 153 of the IoT endpoint 106 from the IoT management agent 163, the IoT management service 116 can add the device properties 153 to the device record 129 created for the IoT endpoint 106. At this point, the IoT endpoint 106 can be considered to be enrolled with the IoT management service 116.

Upon enrollment in the device campaign 133, one or more compliance policies 139 specified by the device campaign 133 can then be applied to the IoT endpoint 106. For example, a compliance policy 139 specifying that a specific software package 141 or with a specific version identifier 143 be installed on an IoT endpoint 106 can be enforced.

To enforce a compliance policy 139 for a newly registered or enrolled IoT endpoint 106, the IoT management service 116 can retrieve the set of policy identifiers 159 specified by a device campaign 133 to which the IoT endpoint 106 has been assigned or subscribed. The IoT management service 116 can then create a command specifying the device identifier 149 of the IoT endpoint 106 and the policy identifiers 159 for each compliance policy 139 listed in the device campaign 133. The command can then be inserted into a command queue 146 associated with the IoT management agent 163 the registered or enrolled the IoT endpoint 106.

The IoT management agent 163 can later retrieve the command from the command queue 146 and analyze the command. For example, after retrieving the command, the IoT management agent 163 can retrieve the specified compliance policies 139 and enforce the compliance policies 139. For instance, if a compliance policy 139 specifies that a particular software package 141 with a particular version identifier 143 is to be installed on an IoT endpoint 106, then the IoT management agent 163 can retrieve the appropriate software package 141 and relay it to the IoT endpoint 106 for installation.

After applying the compliance policies 139, the IoT management agent 163 can send a response to the IoT management service 116 indicating that the compliance policies 139 were successfully applied. For example, the IoT management service 116 could send a response that the software packages 141 were installed. The IoT management service 116 could then update a device record 129 for the IoT endpoint 106 to indicate that the device campaign 133 has been successfully applied to the IoT endpoint 106.

At a later point in time, a new software package 141 may be uploaded to the data store 126. For example, an administrative user may use the management console 119 to store an updated version of an existing software package 141 to the data store 126. In some instances, the administrative user may specific the version identifier 143 of the software package 141. In other instances, the version identifier 143 may be embedded within the software package 141 itself (e.g., as metadata included in the package file). As another example, the IoT management service 116 may download or otherwise retrieve the new version of the software package 141 from a previously defined software repository.

The IoT management service 116 can then detect the presence of the new version of the software package 141. For example, if the new version of the software package 141 were uploaded through the management console 119, the management console 119 may send a message to the IoT management service 116 to notify it of the presence of the new version of the software package 141. As another example, if the new version of the software package 141 were retrieved from a software repository by the IoT management service 116, the IoT management service 116 may note the presence of the new version of the software package 141 in the data store 126 after the software package 141 is successfully stored in the data store 126.

In response to the presence of the new version of the software package 141, the IoT management service 116 may create a new device campaign 133 for updating the version of the software package 141 installed on IoT endpoints 106 to the new version of the software package 141. This can involve creating a new compliance policy 139 that specifies the version identifier 143 for the new version of the software package 141. The new compliance policy 139 can then be assigned to the new device campaign 133. A copy of the enrolled device identifiers 161 from the device campaign 133 for the previous version of the software package 141 may be included in the new device campaign 133, thereby subscribing the IoT endpoints 106 to the new device campaign 133 and causing the new version of the software package 141 to be installed on the IoT endpoints 106.

Figure 2:
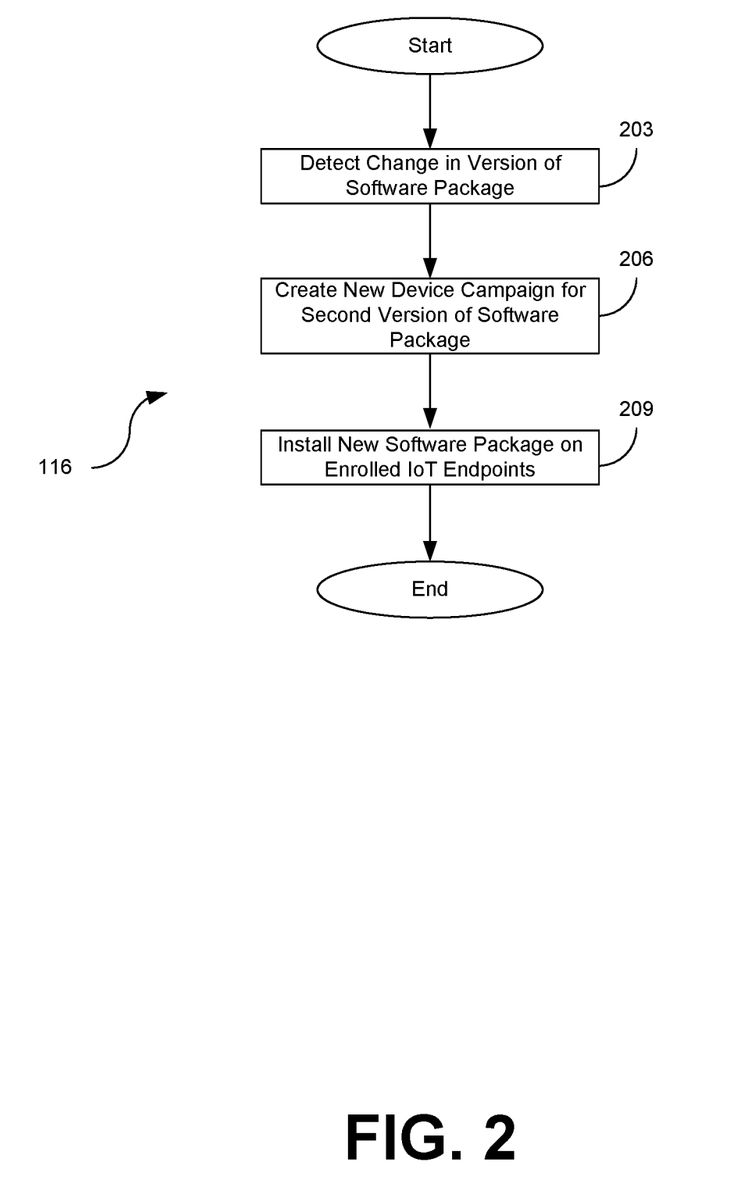
FIGS. 2 and 3 are flowcharts depicting examples of the operation of components of the network environment of FIG. 1.

Referring next to FIG. 2, shown is a flowchart that provides one example of the operation of the IoT management service 116. It is understood that the flowchart of FIG. 2 provides merely an example of the many different types of functional arrangements that can be employed to implement the operation of the IoT management service 116. As an alternative, the flowchart of FIG. 2 can be viewed as depicting an example of elements of a method implemented in the computing environment 101.

Beginning at step 203, the IoT management service 116 can detect that a new version of a software package 141 has been stored in the data store 126. Detection of the new version of the software package 141 can be performed using a variety of approaches, depending on the particular implementation. Several examples are provided in the following paragraphs.

As a first example, the IoT management service 116 may be explicitly notified that the software package 141 has been updated to a new version. For example, when an administrative user manually uploads or otherwise stores a new version of a software package 141 to the data store 126 using the management console 119, the management console 119 may send a message or other notification to the management service 116. The message may indicate that a new version of the software package 141 has been stored in the data store 126. In some instances, such as those where multiple versions of the software package 141 are stored in the data store 126, the message may also include the version identifier 143 of the new version of the software package 141 uploaded to the data store 126.

As a second example, the IoT management service 116 may be preconfigured to periodically check a third-party software repository for a new version of the software package 141. When the IoT management service 116 retrieves a new version of the software package 141 and stores it in the data store 126, the IoT management service 116 can make a note that the new version of the software package 141 has been saved in the data store 126. The IoT management service 116 may also note the version identifier 143 of the software package 141.

As a third example, the IoT management service 116 may scan the software package 141 itself to see if the software package 141 has changed. For example, the IoT management service 116 may periodically retrieve the version identifier 143 from the software package 141 and compare it to the value of a previously retrieved version identifier 143. If the values of the version identifier 143 fail to match, then the IoT management service 116 can determine that the software package 141 has been updated to a new version. For instance, if a checksum listed as the version identifier 143 of the software package 141 fails to match a previously retrieved checksum for the software package 141, then the IoT management service 116 can determine that a new version of the software package 141 is present in the data store 126. Likewise, if a version number listed as the version identifier 143 fails to match a previously retrieved version number for the software package 141, then the IoT management service 115 can determine that a new version of the software package 141 is present in the data store 126.

Then at step 206, the IoT management service 116 can create a new device campaign 133 to cause the new version of the software package 141 to be installed on IoT endpoints 106 with a previous version of the software package 141 installed. First, the IoT management service 116 can create a new compliance policy 139 that specifies the version identifier 143 for the new version of the software package 141 to be installed on IoT endpoints. Then, the IoT management service 116 can create a copy of the device campaign 133 created to install the previous version of the software package 141. The IoT management service 116 may then replace the policy identifier 159 included in the copy of the device campaign 133 with the policy identifier 159 of the new compliance policy 139 that specifies the version identifier 143 for the new version of the software package 141. The modified copy of the device campaign 133 can then be saved as a new device campaign 133. Because no changes were made to the enrolled device identifiers 161, the IoT endpoints subscribed to the prior device campaign 133 to receive the previous version of the software package 141 are automatically subscribed to the new device campaign 133 to receive the new version of the software package 141.

Finally, at step 209, the IoT management service 116 can cause the compliance policy 139 specifying the version identifier 143 for the new version of the software package 141 to be applied to the IoT endpoints 106 listed in the enrolled device identifiers 161. For example, the IoT management service 116 can create a command for each IoT endpoint 106 identified in the enrolled device identifiers 161. The command can specify the device identifier 149 of a respective IoT endpoint and a policy identifier 159 for the compliance policy 139 that specifies the new version of the software package 141. Each command can then be inserted into a command queue 146 associated with the IoT management agent 163 that registered or enrolled the IoT endpoint 106, thereby causing the compliance policy 139 to be retrieved by the IoT management agent 163, which will then install the new version of the specified software package 141 on each IoT endpoint 106 managed by the IoT management agent 163.

Figure 3:
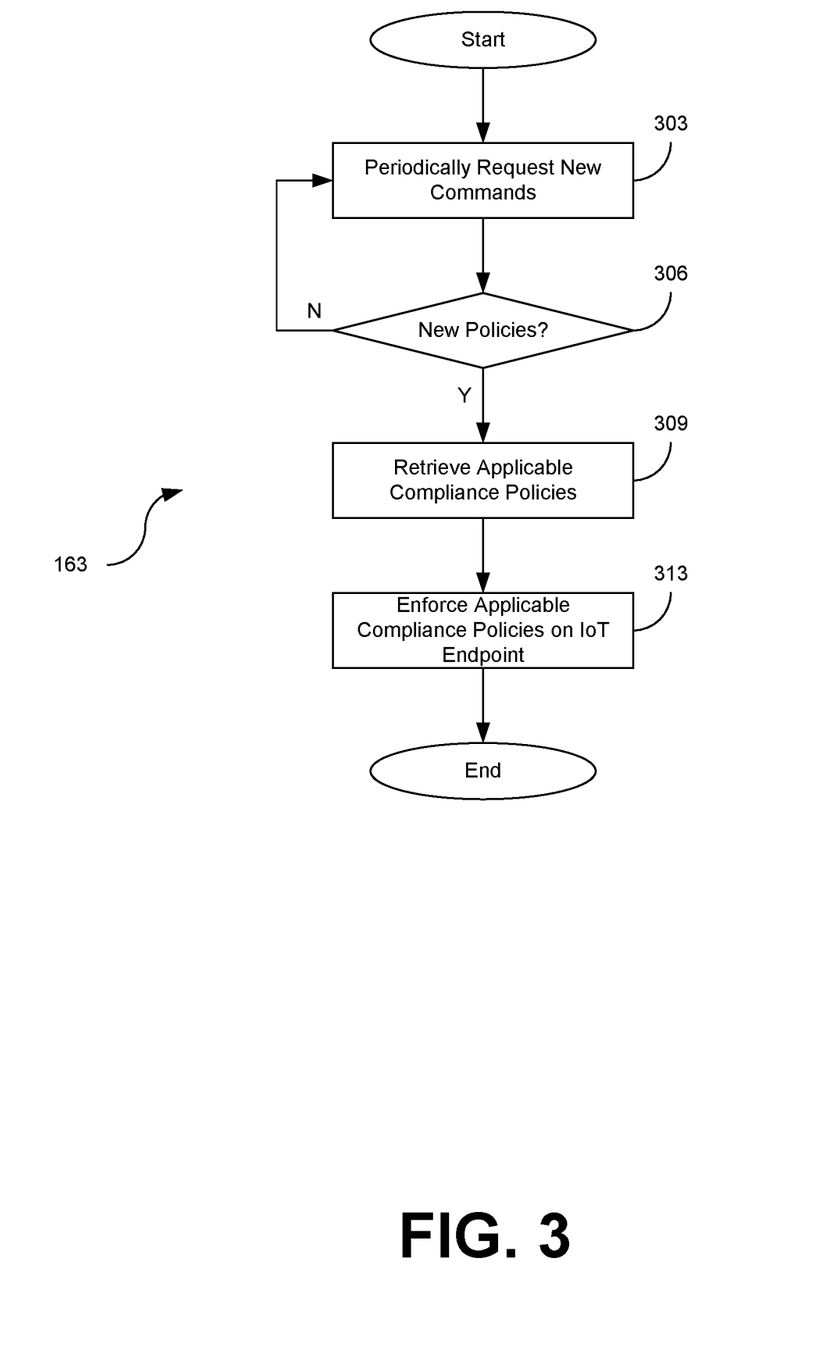

Referring next to FIG. 3, shown is a flowchart that provides one example of the operation of the IoT management agent 163. It is understood that the flowchart of FIG. 3 provides merely an example of the many different types of functional arrangements that can be employed to implement the operation of the IoT management agent 163. As an alternative, the flowchart of FIG. 3 can be viewed as depicting an example of elements of a method implemented in the computing environment 101.

Beginning at step 303, the IoT management agent 163 can periodically request applicable new compliance policies 139. For example, the management agent 163 may send a message to the management service 116 requesting any commands in the command queue 146 that are intended for one or more IoT endpoints 106 managed by the IoT management agent 163. For instance, the management agent 163 could send one or more device identifiers 149 to the IoT management service 116 at a periodic interval (e.g., every minute, every 15 minutes, every hour, every day, etc.).

Then, at step 306, the IoT management agent 163 can determine whether any new commands are available. For example, in response to the message sent at step 303, the IoT management service 116 could provide commands stored in the command queue 146 that are identified as being intended for one or more devices in the set of device identifiers 149 provided by the IoT management service 116. The IoT management agent 163 could then determine whether the commands include any new compliance policies 139 to be applied to respective IoT endpoints 106. For example, a command could include a policy identifier 159 for a new compliance policy 139 that specifies that a new version of a software package 141 is to be installed on an IoT endpoint 106. If the IoT management agent 163 does not receive any new commands, then the process may proceed back to step 303. However, if the IoT management agent 163 receives at least one new command, then the process proceeds to step 309.

Subsequently at step 309, the IoT management agent 163 can retrieve one or more applicable compliance policies 139 for the newly enrolled IoT endpoint 106. For example, the IoT management agent 163 can retrieve one or more commands from the command queue 146. One or more of these commands can specify a policy identifier 159 of a compliance policy 139 to be enforced on or applied to the newly enrolled IoT endpoint 106. In response, the IoT management agent 163 can retrieve the applicable compliance policies 139 identified by the policy identifiers 159 listed in the commands retrieved from the command queue 146.

Then, at step 313, the IoT management agent 163 can cause the applicable compliance policies 139 to be enforced for the newly enrolled IoT endpoint 106. As an example, if the compliance policy 139 specifies that a specific version of a software package 141 be installed on the IoT endpoint 106, such as a new version of the software package 141, the IoT management agent 163 can invoke a function provided by an application programming interface (API) of the IoT endpoint 106 to cause the IoT endpoint 106 to download and install the software package 141 with the version identifier 143 specified by the compliance rule 139. An argument to the function could be the network address or path for the software package 141 to be installed. As another example, the IoT management agent 163 could retrieve the software package 141 with the specified version identifier 143 and provide it to the IoT endpoint 106 (such as an argument to a function provided by an API) for installation. As a result, the compliance policy 139 is enforced so that the IoT endpoint 106 is automatically updated to the latest version of the software package 141.

Although the IoT management service 116, the IoT management agent 119, and other various systems described herein can be embodied in software or code executed by general-purpose hardware as discussed above, as an alternative, the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The flowcharts show examples of the functionality and operation of various implementations of portions of components described in this application. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the flowcharts show a specific order of execution, it is understood that the order of execution can differ from that which is depicted. For example, the order of execution of two or more blocks can be scrambled relative to the order shown. In addition, two or more blocks shown in succession can be executed concurrently or with partial concurrence. Further, in some examples, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic can include, for example, statements including program code, instructions, and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described examples of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure.

What is claimed is:

1. A system, comprising:
   a computing device comprising a processor and a memory;
   machine readable instructions stored in the memory that, when executed by the processor, cause the computing device to at least:
   determine that a second version of a software package assigned to an existing device campaign has been uploaded to a data store, the existing device campaign comprising an existing compliance policy applicable to individual IoT endpoints assigned to the existing device campaign, the compliance policy specifying that a first version of the software package be installed on the individual IoT endpoints; and
   create a new device campaign comprising a new compliance policy applicable to the individual IoT endpoints assigned to the new device campaign, the new compliance policy specifying that the second version of the software package be assigned to the individual IoT endpoints, wherein the new device campaign is created by creating a copy of the existing device campaign created to install the first version of the software package on the individual IoT endpoints, replace a first policy identifier included in the existing device campaign with a second policy identifier associated with new compliance policy in the copy of the existing device campaign, wherein the second policy identifier specifies the second version of the software package.

2. The system of claim 1, wherein the machine readable instructions that cause the computing device to determine that the second version of the software package has been uploaded to the data store further cause the computing device to at least:
   determine that a first checksum of the first version of the software package differs from a second checksum of the second version of the software package.

3. The system of claim 1, wherein the machine readable instructions that cause the computing device to determine that the second version of the software package has been uploaded to the data store further cause the computing device to at least:
   compare a first version identifier included in a first set of metadata associated with the first version of the software package with a second version identifier included in a second set of metadata associated with the second version of the software package.

4. The system of claim 1, wherein the machine readable instructions that cause the computing device to determine that the second version of the software package has been uploaded to the data store further cause the computing device to at least:
   identify a version indicator submitted with the second version of the software package; and
   determine that the version indicator specifies that the second version of the software package is a newer version than the first version of the software package.

5. The system of claim 1, wherein the machine readable instructions that cause the computing device to create the new device campaign further cause the computing device to at least:
- create a copy of the existing device campaign;
- create the new compliance policy specifying that the second version of the software package be assigned to the individual IoT endpoints;
- replace the existing compliance policy specified in the copy of the existing device campaign with the new compliance policy; and
- save the copy of the existing device campaign as the new device campaign.

6. The system of claim 1, wherein the software package comprises an installer for a binary application executable by the individual IoT endpoints.

7. The system of claim 1, wherein the software package comprises an installer for a firmware for the individual IoT endpoints.

8. A method, comprising:
- determining that a second version of a software package assigned to an existing device campaign has been uploaded to a data store, the existing device campaign comprising an existing compliance policy applicable to individual IoT endpoints assigned to the existing device campaign, the compliance policy specifying that a first version of the software package be installed on the individual IoT endpoints; and
- creating a new device campaign comprising a new compliance policy applicable to the individual IoT endpoints assigned to the new device campaign, the new compliance policy specifying that the second version of the software package be assigned to the individual IoT endpoints, wherein the new device campaign is created by creating a copy of the existing device campaign created to install the first version of the software package on the individual IoT endpoints, replace a first policy identifier included in the existing device campaign with a second policy identifier associated with new compliance policy in the copy of the existing device campaign, wherein the second policy identifier specifies the second version of the software package.

9. The method of claim 8, wherein determining that the second version of the software package has been uploaded to the data store further comprises:
- determining that a first checksum of the first version of the software package differs from a second checksum of the second version of the software package.

10. The method of claim 8, wherein determining that the second version of the software package has been uploaded to the data store further comprises:
- comparing a first version identifier included in a first set of metadata associated with the first version of the software package with a second version identifier included in a second set of metadata associated with the second version of the software package.

11. The method of claim 8, wherein determining that the second version of the software package has been uploaded to the data store further comprises:
- identifying a version indicator submitted with the second version of the software package; and
- determining that the version indicator specifies that the second version of the software package is a newer version than the first version of the software package.

12. The method of claim 8, wherein creating the new device campaign further comprises:
- creating a copy of the existing device campaign;
- creating the new compliance policy specifying that the second version of the software package be assigned to the individual IoT endpoints;
- replacing the existing compliance policy specified in the copy of the existing device campaign with the new compliance policy; and
- saving the copy of the existing device campaign as the new device campaign.

13. The method of claim 8, wherein the software package comprises an installer for a binary application executable by the individual IoT endpoints.

14. The method of claim 8, wherein the software package comprises an installer for a firmware for the individual IoT endpoints.

15. A non-transitory, computer-readable medium, comprising machine readable instructions that, when executed by a processor, cause a computing device to at least:
- determine that a second version of a software package assigned to an existing device campaign has been uploaded to a data store, the existing device campaign comprising an existing compliance policy applicable to individual IoT endpoints assigned to the existing device campaign, the compliance policy specifying that a first version of the software package be installed on the individual IoT endpoints; and
- create a new device campaign comprising a new compliance policy applicable to the individual IoT endpoints assigned to the new device campaign, the new compliance policy specifying that the second version of the software package be assigned to the individual IoT endpoints, wherein the new device campaign is created by creating a copy of the existing device campaign created to install the first version of the software package on the individual IoT endpoints, replace a first policy identifier included in the existing device campaign with a second policy identifier associated with new compliance policy in the copy of the existing device campaign, wherein the second policy identifier specifies the second version of the software package.

16. The non-transitory, computer-readable medium of claim 15, wherein the machine readable instructions that cause the computing device to determine that the second version of the software package has been uploaded to the data store further cause the computing device to at least:
- determine that a first checksum of the first version of the software package differs from a second checksum of the second version of the software package.

17. The non-transitory, computer-readable medium of claim 15, wherein the machine readable instructions that cause the computing device to determine that the second version of the software package has been uploaded to the data store further cause the computing device to at least:
- compare a first version identifier included in a first set of metadata associated with the first version of the software package with a second version identifier included in a second set of metadata associated with the second version of the software package.

18. The non-transitory, computer-readable medium of claim 15, wherein the machine readable instructions that cause the computing device to determine that the second version of the software package has been uploaded to the data store further cause the computing device to at least:
- identify a version indicator submitted with the second version of the software package; and
- determine that the version indicator specifies that the second version of the software package is a newer version than the first version of the software package.

19. The non-transitory, computer-readable medium of claim 15, wherein the machine readable instructions that cause the computing device to create the new device campaign further cause the computing device to at least:
- create a copy of the existing device campaign;
- create the new compliance policy specifying that the second version of the software package be assigned to the individual IoT endpoints;
- replace the existing compliance policy specified in the copy of the existing device campaign with the new compliance policy; and
- save the copy of the existing device campaign as the new device campaign.

20. The non-transitory, computer-readable medium of claim 15, wherein the software package comprises an installer for a binary application executable by the individual IoT endpoints or for a firmware for individual IoT endpoints.

* * * * *